June 2, 1925.

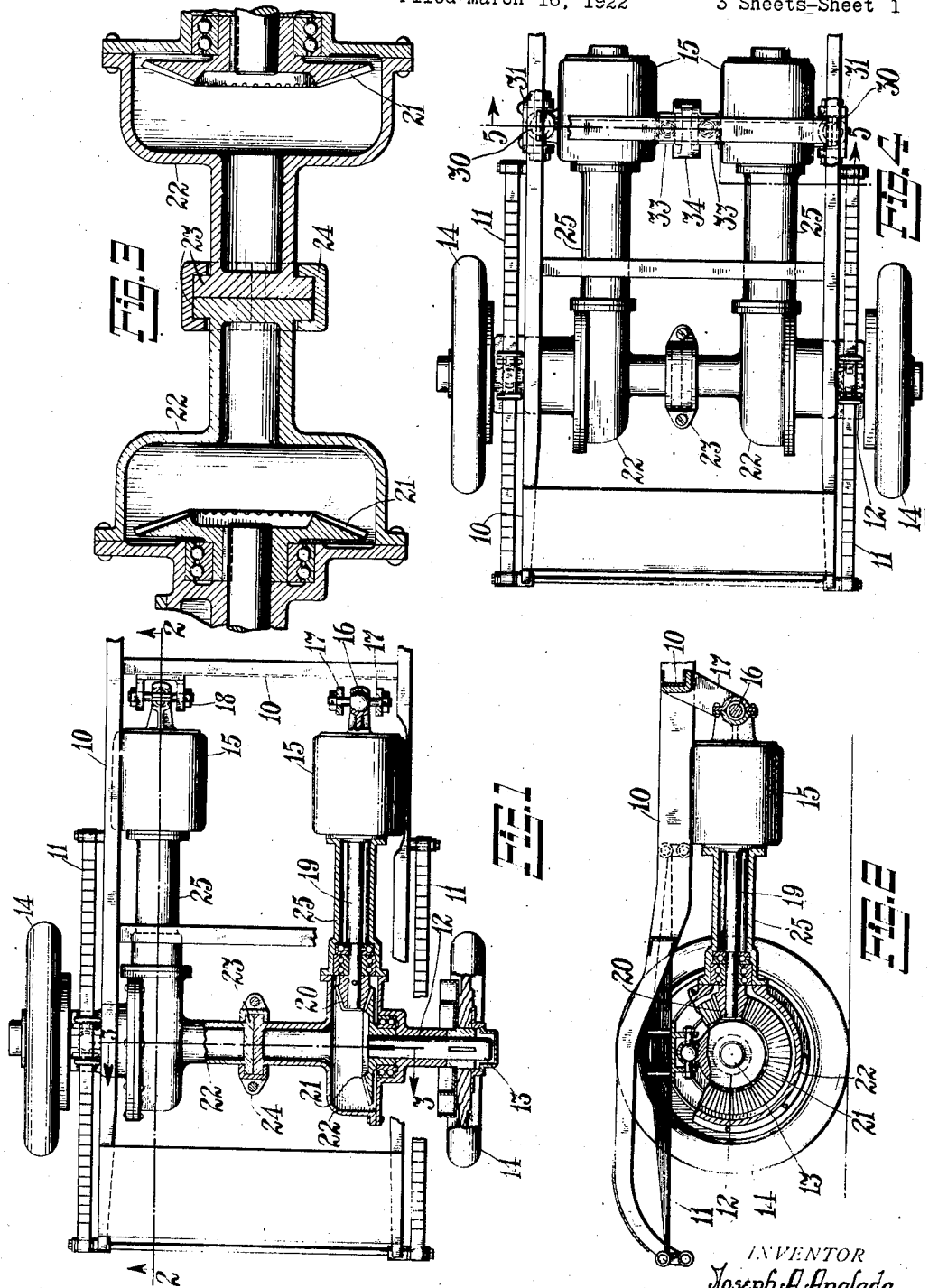

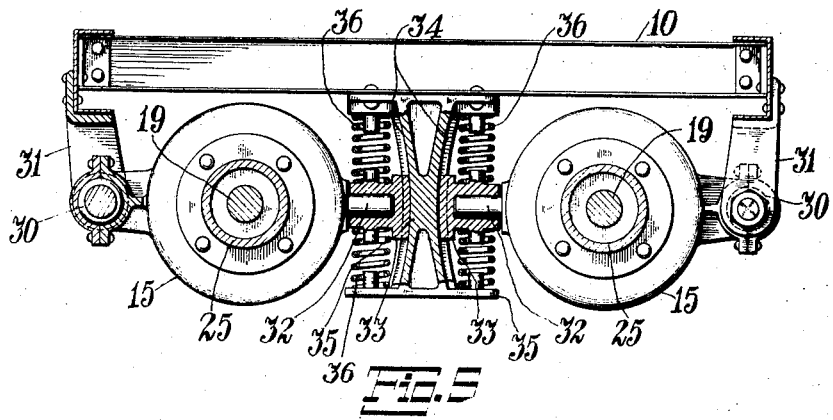
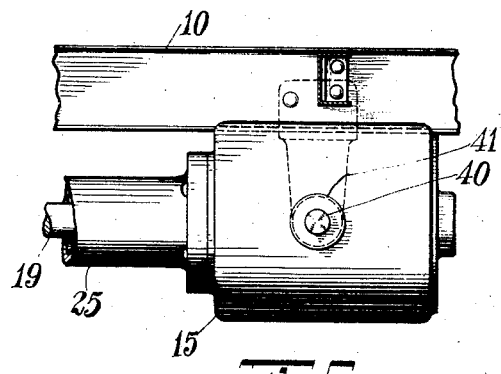
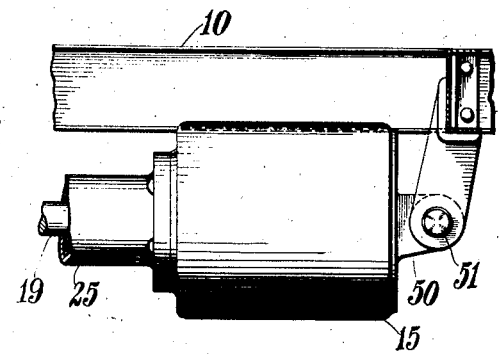
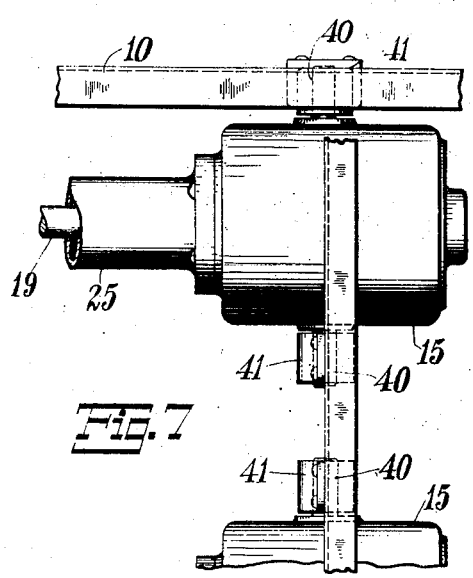
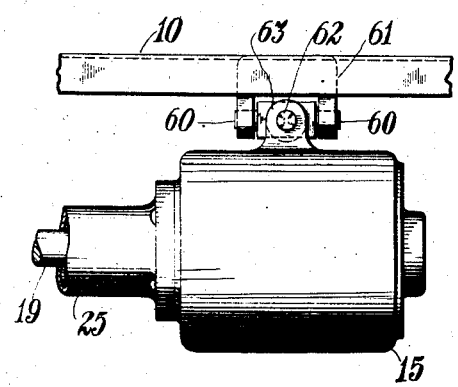

J. A. ANGLADA 1,540,526

MOTOR VEHICLE

Filed March 16, 1922

INVENTOR
Joseph A. Anglada.
BY
E. M. Marshall
ATTORNEY

Patented June 2, 1925.

1,540,526

UNITED STATES PATENT OFFICE.

JOSEPH A. ANGLADA, OF JENKINTOWN, PENNSYLVANIA.

MOTOR VEHICLE.

Application filed March 16, 1922. Serial No. 544,342.

*To all whom it may concern:*

Be it known that I, JOSEPH A. ANGLADA, a citizen of the United States, and a resident of Jenkintown, county of Montgomery, and State of Pennsylvania, have invented certain new and useful Improvements in Motor Vehicles, of which the following is a specification.

This invention relates to motor vehicles and particularly to the type of vehicle driven by electric motors. Furthermore the invention relates to the motor mounting of the vehicle drive wheels.

One of the objects of the invention is to provide in a motor vehicle having a separate motor for each drive wheel, and a motor mounting constructed and arranged to permit independent vertical movement of the wheels when the vehicle is being propelled over uneven road surfaces.

Another object of the invention is to so mount the drive motors for an electrically operated motor vehicle that the motor casing and connecting housing between the motor and the rear axle will act as a radius rod and assist in transmitting the drive or propelling effort from the vehicle wheels to the vehicle frame.

Further objects of the invention will appear from the following specifications taken in connection with the drawings and forming a part of this application and in which Fig. 1 is a top plan view, partly in section, of the rear end of a motor vehicle chassis illustrating the motor mounting and the drive connections and housing between the motor and the wheel axles and wheels.

Fig. 2 is a sectional elevation taken substantially on line 2—2 of Fig. 1.

Fig. 3 is a transverse sectional elevation illustrating the rear axle housing and taken substantially on line 3—3 of Fig. 1.

Fig. 4 is a top plan view, partly in section, similar to Fig. 1, but showing another form of the invention.

Fig. 5 is a transverse sectional elevation taken substantially on line 5—5 of Fig. 4.

Figs. 6 and 7 illustrate in side elevation and top plan, another form of motor mounting.

Fig. 8 is a side elevation showing another form of motor mounting constructed in accordance with the invention.

Fig. 9 is a side elevation of still another form of motor mounting constructed in accordance with the invention.

Figure 10:
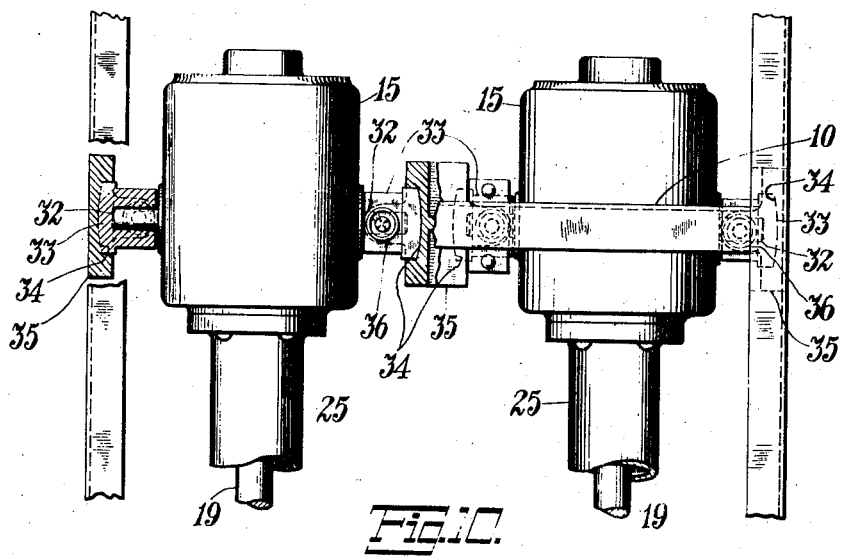
Fig. 10 is a top plan view, partly in section, of another construction embodying the invention

The invention may be briefly described as comprising a vehicle frame having drive wheels provided with axles and connected to the frame adjacent the rear end thereof and a separate motor mounted on the frame and connected to each of the wheel axles by suitable driving connections. The motors are so connected to the frame that they may move vertically and permit tortional movement of the frame with respect thereto and the motor casings are connected to the rear axle housings in such a manner that the motor casings and housings will assist in transmitting the drive from the wheels to the vehicle frame. In certain embodiments of the invention shown the wheel axles are provided with separate housings which are connected in a manner to permit relative rotation of one housing with respect to the other.

Referring to the drawings wherein like characters of reference designate corresponding parts throughout the several views, I have shown a portion of the rear end of a motor vehicle chassis having a main frame 10 to which are secured springs 11 and to each of the springs is secured a housing 12 for one of the wheel axles 13. Wheels 14 are mounted on the wheel axles.

Referring first to the form of the invention shown in Figs. 1–3, each wheel axle and wheel are driven from a separate motor 15 and each motor is connected through a universal or ball in socket joint 16 to trunnions 17 which in turn are pivoted in arms 18 of a bracket secured to the vehicle frame.

As clearly illustrated in the drawings, the motors are mounted with their drive shafts 19 extending longitudinally with the main frame of the vehicle and these shafts are connected through bevel gears 20 and 21 to the wheel axles 13. A rear axle casing 22 is bolted to each of the housings 12 and the two casings 22 are provided with laterally extending flanges 23 and these flanges are enclosed within a flange collar 24 in a manner to permit relative rotation of one housing with reference to the other. The housings 12 and casings 22 are connected to casings 25, the other ends of which are connected to the casings of the motors 15.

In the type of vehicle above described it will be understood that the drive from the vehicle wheels to the frame is in the main transmited to the frame through the springs 11. It will be evident, however, that the motor casing and connecting housings and casings between the motor casing and the wheel axles will operate to transmit a portion of this drive or propelling effort to the vehicle frame, thereby acting as radius rods.

It will be clear from the foregoing description that by mounting the motors on the frame in the manner described and by connecting the rear axle housings 22 as set forth, independent vertical movement of one of the wheels and its motor and connecting housings will be permitted without interfering with the proper operation of the vehicle drive or with the other wheel and motor. When this takes place the motor at the side of the vehicle on which is located the wheel that is moved vertically will swing in the joint 16 and on the trunnions 17 and the housing 22 at that side of the vehicle will rotate in the collar 24 with reference to the other housing 22.

Another form of the invention is illustrated in Figs. 4 and 5 and in this form each motor is connected through a universal joint 30 to a bracket 31 secured to the vehicle frame. The connections through the joint 30 are made from one side of the motor casing and between the front and rear ends thereof and in this manner the weight of the motor will tend to counterbalance the weight of the rear axle and the connecting housings.

At the opposite sides of the motor casings from the universal joint connections 30 each casing has secured thereto a laterally extending trunnion 32 mounted in a trunnion box 33. Each of the boxes 33 is slidably mounted in a vertically extending arcuate slot 34 formed in bracket 35 suspended from the main frame of the vehicle. On the opposite sides of each of the boxes 33 and in the slots 34 are positioned springs 36 which support the trunnion box and trunnions of the motor casings.

The motor mounting last described operates in a manner similar to that already described and permits the motor casing to rotate vertically on an axis transverse to the motor casing and also permits rotation about an axis parallel to the motor axis.

In Figs. 6 and 7 a simpler form of motor mounting is illustrated and in this form the motor casing is supported on trunnions 40 extending laterally from each side thereof, these trunnions being disposed intermediate the front and the rear ends of the motor thereby securing the counterbalancing effect noted in connection with the form of the invention shown in Figs. 4 and 5. The trunnions 40 are mounted in bearing boxes 41 carried by or formed in brackets secured to the main frame. In this form of the invention as in the forms already described the drive will be transmitted through the motor casing and connecting housings from the wheels to the vehicle frame.

In Fig. 8 is illustrated a form of mounting somewhat similar to that shown in Figs. 1 and 2 but differeing in that the lugs 50 formed on the front end of the motor casing are mounted on trunnions 51 pivotally supported in a suitable bracket carried by the main frame whereas in the form of the invention shown in Figs. 1 and 2 the motor casing is connected to the bracket through a universal joint.

In Fig. 9 still another form of the invention is illustrated and in this form the motor is suspended from the main frame by means of a connection between the central portion of the motor casing and the frame. This connection consists of a universal joint of common construction and having trunnions 60 pivotally mounted in a bracket 61 secured to the frame and trunnions 62 extending at right angles to the trunnions 60 and pivotally mounted in lugs 63 formed on or secured to the motor casing. By this mounting movement of the motor casing about axes transverse to and longitudinal of the casing is permittted.

Figure 11:
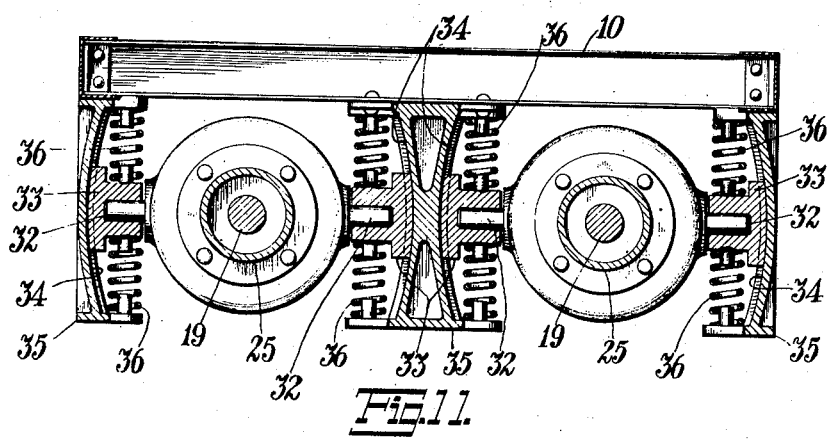
Fig. 11 is a vertical sectional elevation of the construction shown in Fig. 10.

In the construction shown in Figs. 10 and 11 the spring supports used in the form of the invention shown in Fig. 5 at the inner portions of the motor casings, are duplicated at the outer portions. The motors are therefore resiliently supported on both sides thereof and are also trunnioned for longitudinal tilting.

From the foregoing specification it will be seen that a simple and practical motor mounting has been provided and moreover that the mounting will permit independent vertical movement of either motor and the wheels connected thereto. Furthermore by means of this mounting the motor casing and the rear axle housings will assist in transmitting the drive from the wheels to the vehicle frame.

In certain embodiments of the invention a resilient motor support has been provided and this support will take up twisting strains or torque due to the starting of the motor or other causes.

Although certain specific embodiments of the invention have been particularly illustrated and described it will be understood that the invention is capable of modification and that further changes in the construction and in the arrangement of the various cooperating parts may be made without departing from the spirit or scope of the invention as expressed in the following claims.

What I claim is:—

1. In a motor vehicle, a frame, drive wheels connected thereto, a pair of motors independently pivoted to said frame, operative driving connections between each motor and one wheel, a casing surrounding the driving connections between each motor and the wheel driven thereby, and a swivel connection between said casings.

2. In a motor vehicle, a frame, drive wheels connected thereto, a pair of motors independently pivoted to said frame, operative driving connections between each motor and one wheel, and a casing surrounding the driving connections between each motor and the wheel driven thereby, said casings being connected to each other in a manner permitting relative rotational movement thereof.

3. In a motor vehicle, a main frame, a pair of drive wheels, an axle for each wheel connected to said frame, a motor for each drive wheel, having a casing connected through a universal joint to the vehicle frame, operative driving connections between each motor and the wheel driven thereby, a casing for each wheel axle and a casing connecting each motor casing to the axle casing of the wheel driven thereby, said axle casings being swiveled to each other.

4. In a motor vehicle, a frame, drive wheels connected thereto, a pair of motors independently pivoted to said frame, operative driving connections between each motor and one wheel, a casing surrounding the driving connection between each motor and the wheel driven thereby, and means for holding said casings in mutual alinement but permitting relative rotation thereof.

5. In a motor vehicle, a frame, drive wheels connected thereto, a pair of motors independently pivoted to said frame, operative driving connections between each motor and one wheel, a casing surrounding the driving connections between each motor and the wheel driven thereby, said casings having abutting outstanding flanges, and means engaging said flanges to hold the casings in mutual alinement but permitting relative rotation thereof.

6. In a vehicle, an axle housing comprising a pair of casings, a wheel supported in each of said casings, and means for holding said casings in mutual alinement but permitting relative rotation thereof.

7. In a vehicle, an axle housing comprising a pair of casings, a wheel supported in each of said casings said casings having abutting outstanding flanges, and means engaging said flanges to hold the casings in mutual alinement but permitting relative rotation thereof.

8. In a motor vehicle, a frame, a pair of drive wheels connected thereto, a motor spaced from and independently connected to each drive wheel and means for pivotally supporting each motor casing on said frame, said pivotal supporting means being resiliently supported in an arcuate bracket carried by the frame.

In witness whereof, I have hereunto set my hand this 21st day of February, 1922.

JOSEPH A. ANGLADA.